June 3, 1952 — E. D. MARKLE — 2,599,269
PHOTOGRAPHIC STAND
Filed Aug. 17, 1949 — 3 Sheets-Sheet 1
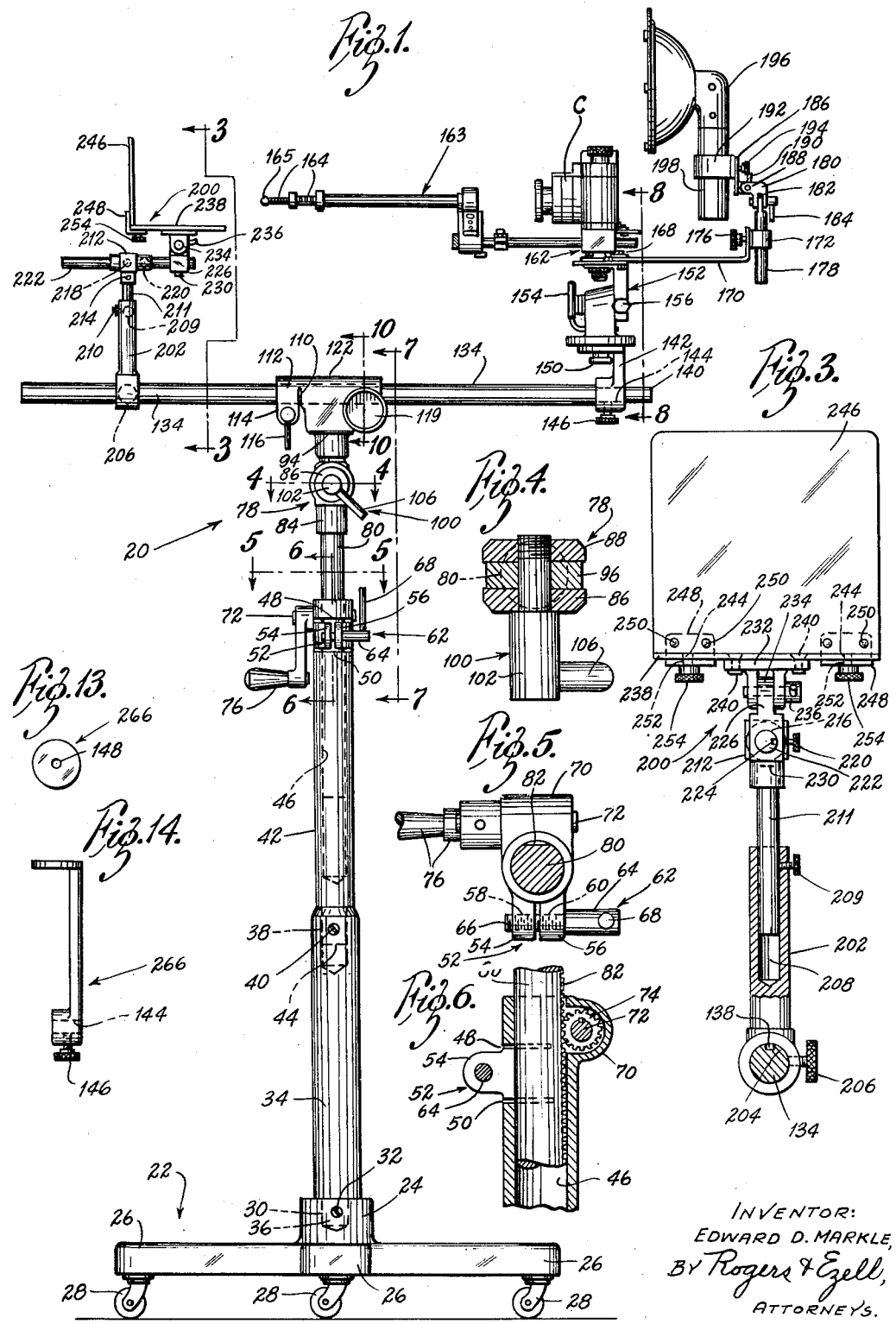
INVENTOR:
EDWARD D. MARKLE,
BY Rogers & Ezell,
ATTORNEYS.

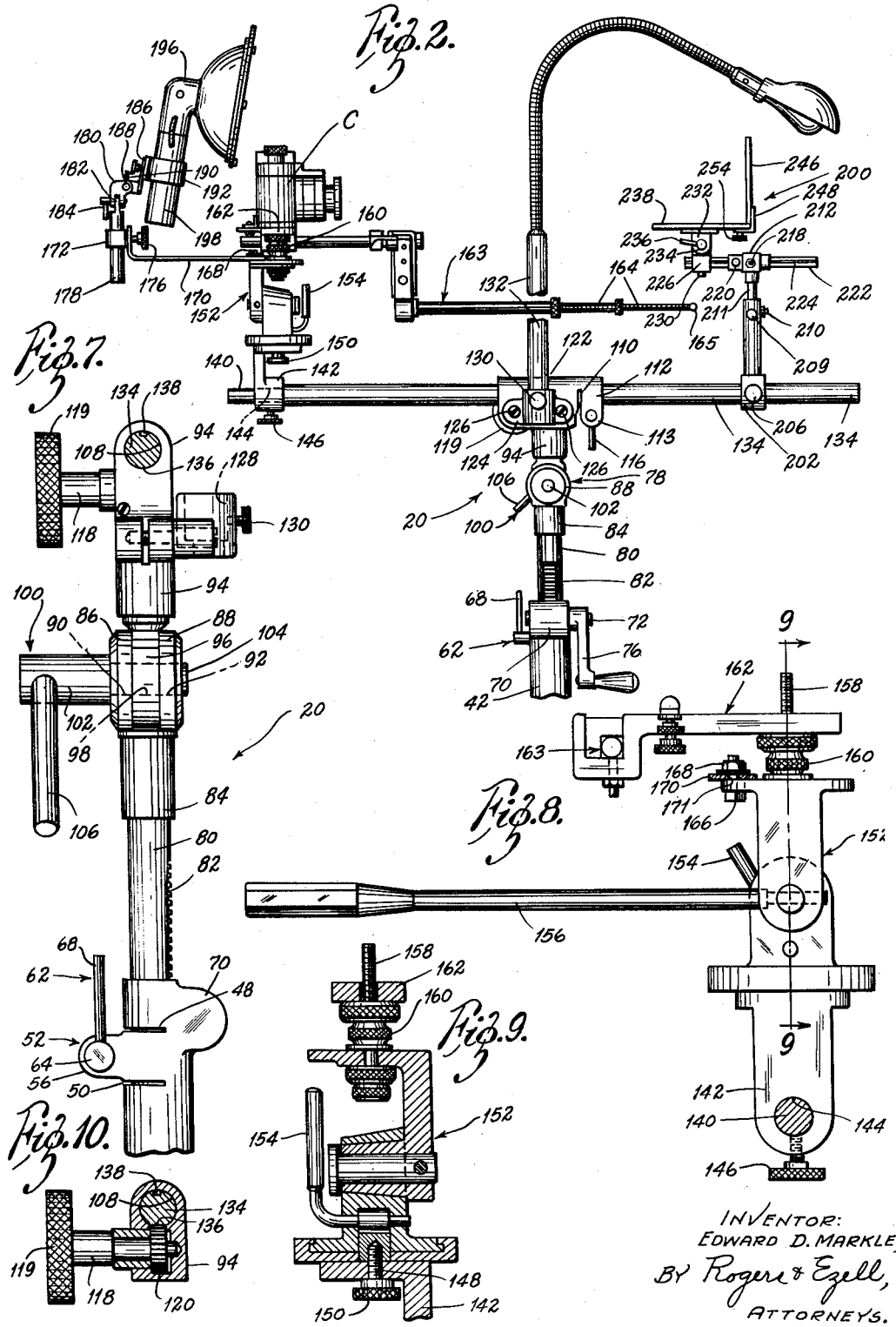

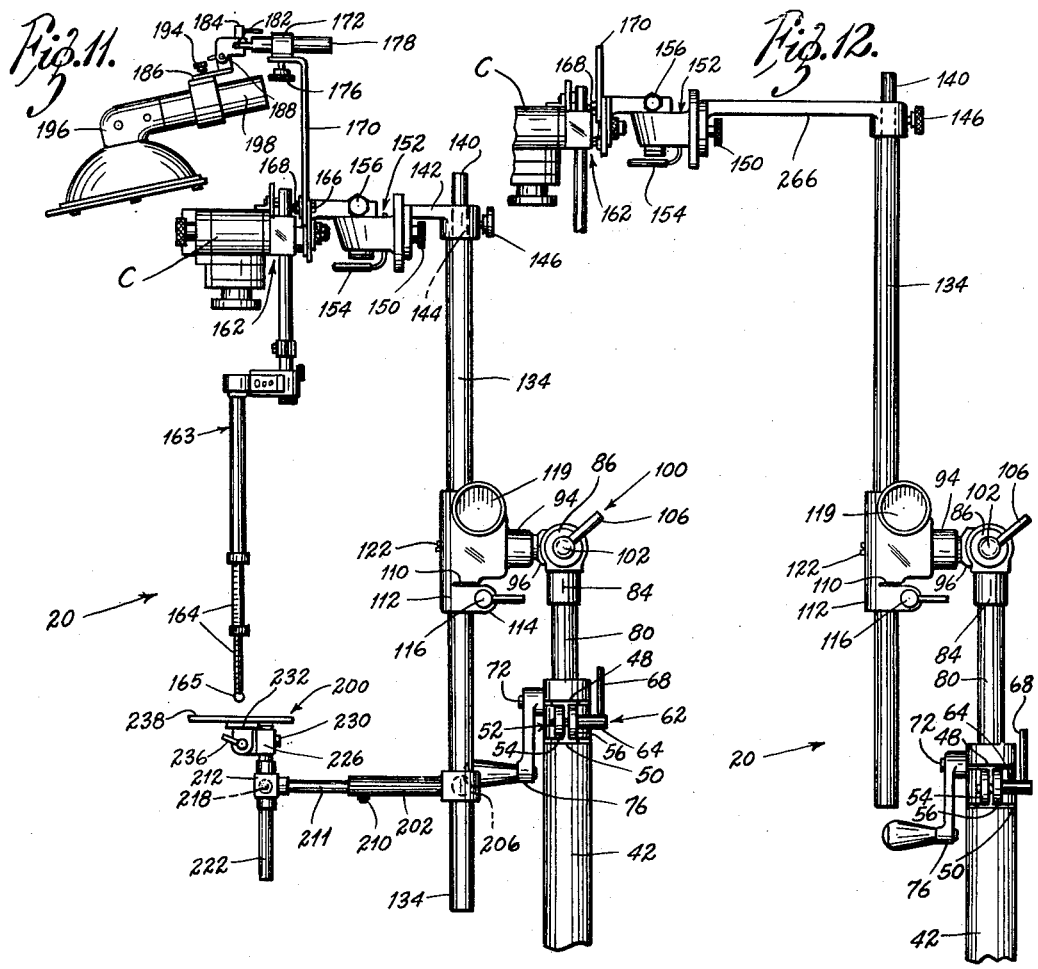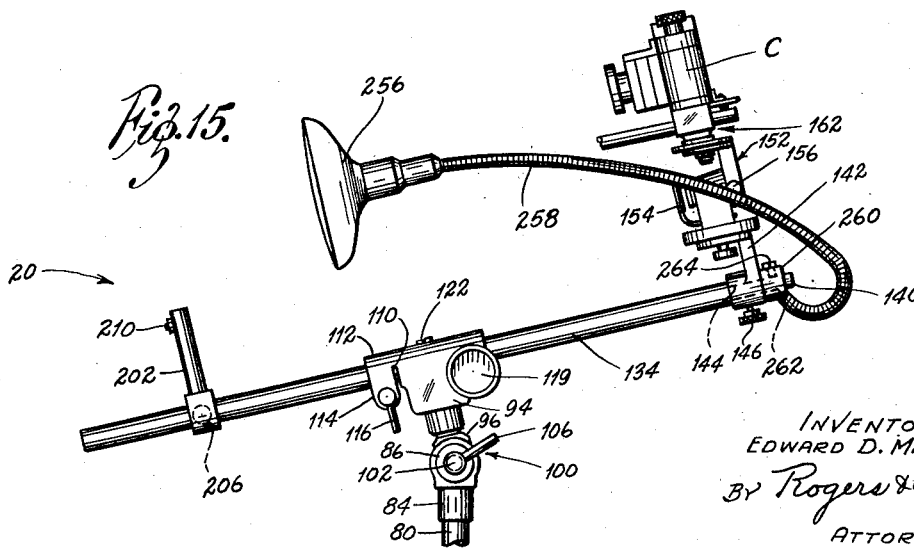

Patented June 3, 1952

2,599,269

UNITED STATES PATENT OFFICE 2,599,269

PHOTOGRAPHIC STAND

Edward D. Markle, Jefferson City, Mo.

Application August 17, 1949, Serial No. 110,717

7 Claims. (Cl. 95—86)

The present invention relates generally to the photographic art, and more particularly to a novel stand for supporting a camera and its associated equipment that may be readily employed to photograph objects of a technical, commercial or scientific nature, both animate and inanimate, at extremely close range in the field of close-up, magnification or clinical photography.

In its preferred form, the stand includes a base member and a bar-like member disposed above it, the latter being adapted to be tilted relative to the base member and to be moved vertically and transversely relative thereto. Locking means are also provided to maintain the bar-like member in selected position. A specimen support, containing a base member and a pair of specimen platforms is slidably and movably mounted on the bar-like member adjacent one end thereof and contains means for pivoting the specimen platforms and for adjusting them both vertically and transversely relative to the base member. A camera support, having universal tilting movement, is removably mounted adjacent the other end of the bar-like member, and means are provided for supporting either flash or floodlight equipment, or both, adjacent the camera support, the lighting equipment being universally adjustable relative to said camera support.

At the present time, if one is desirous of taking photographs of various portions of the human anatomy during an operation or the like, a great deal of time is consumed and the work of the surgeon interfered with by the photographer assembling and adjusting the various pieces of his equipment.

Many surgeons are desirous of having the various phases of an unusual operation photographed because that is one manner whereby the members of the profession teach one another new techniques. However, rather than cease work long enough for the photographer to assemble and adjust his lights and other equipment by the known methods, many surgeons forego the taking of photographs so as not to jeopardize the life of their patient.

Another defect of the known equipment is that heretofore it has been necessary for the photographer to occupy a position above the operating table in order to focus the camera by peering into the ground glass plate associated therewith, thereby risking the chance of having foreign matter fall into the surgical field.

There is also a great need at the present time for a photographic stand for photographing specimens and the like whereby they can be photographed quickly and with good results, inasmuch as most of the present equipment requires a relatively long time for assembling and adjustment.

In like manner, an urgency exists in the commercial and scientific as well as in the clinical field for photographic equipment, wherein the necessary elements are combined in such a manner as to provide a synchronization, the resultant effect being the minimum requirement needed of a combination of the photographic elements to operate as a single unit.

It is an object of the present invention, therefore, to provide a novel photographic stand which supports, in closely assembled and adjustable positions, all of the elements which are required for taking photographs of small and difficultly accessible portions of the human body such as organs revealed by surgical incisions or contained in body cavities such as the mouth.

Another object is to provide a novel photographic stand wherein the camera in combination with its associated accessories operating as a unit can be employed to photograph advertising copy in the commercial field such as instruments, jewelry, flowers, etc.

Another object is to provide a novel photographic stand which supports, in closely assembled and adjustable positions, all of the elements which are required for taking photographs of specimens.

Another object is to provide a novel photographic stand for taking photographs of operations whereby the photographer does not have to assume a position above the operating table in order to focus or otherwise adjust the camera.

Another object is to provide a novel photographic stand for taking clinical or commercial photographs whereby good results can be achieved with a relatively inexpensive 35 mm. camera.

Another object is to provide a novel photographic stand for taking clinical or commercial photographs which contains supporting means for both flash and flood-light equipment.

Another object is to provide a novel photographic stand for taking clinical or commercial photographs which contains supporting means for a modeling light.

Another object is to provide a novel photographic stand for taking clinical or commercial photographs which includes a flashlight supporting means which is mounted for universal tilting movement and which can be adjusted longitudinally and vertically of the subject, and which can be positioned in back of or alongside of the camera.

Another object is to provide a novel photographic stand for taking clinical or commercial photographs which can be quickly and easily adjusted by a single operator after a minimum amount of experience.

Another object is to provide a novel photographic stand for taking clinical or commercial photographs which can be easily and quickly disassembled and packaged in two containers for easy transportation.

Further objects and advantages of the present invention will be apparent from the following description, reference being had to the accompanying drawings wherein a preferred embodiment of the present invention is shown, in which:

Fig. 1 is a side elevational view of a photographic stand embodying the teachings of the present invention, shown with flash equipment and a specimen support, the focal pointer being in the optical axis position;

Fig. 2 is a side elevational view of the other side of the upper portion of the stand shown with flash equipment, a specimen stand, and a modeling light, the focal pointer being pivoted to the "out of focus range" position;

Fig. 3 is an enlarged vertical transverse sectional view taken on the line 3—3 in Fig. 1;

Figs. 4 and 5 are enlarged horizontal transverse sectional views taken on the lines 4—4 and 5—5, respectively, in Fig. 1;

Figs. 6, 7 and 8 are enlarged fragmentary vertical sectional views taken on the lines 6—6, 7—7, and 8—8, respectively, in Fig. 1;

Fig. 9 is a fragmentary vertical sectional view taken on the line 9—9 in Fig. 8;

Fig. 10 is an enlarged vertical transverse sectional view taken on the line 10—10 in Fig. 1;

Fig. 11 is a fragmentary side elevational view of the photographic stand showing the upper portion pivoted to a vertical position for taking photographs of specimens positioned on a horizontal support;

Fig. 12 is a fragmentary side elevational view somewhat similar to Fig. 11, but showing the long pan head extension which is used when photographing subjects on an operating table;

Fig. 13 is a top plan view of the long pan head support;

Fig. 14 is a side elevational view of the long pan head support; and

Fig. 15 is a fragmentary side elevational view of the upper portion of the stand, illustrating its use with flood lights.

Referring to the drawings more particularly by reference numerals, 20 indicates generally a photographic stand constructed in accordance with the teachings of the present invention.

It includes a base member 22 which contains a cylindrical body portion 24 and outwardly extending leg portions 26. Casters 28 are removably secured adjacent the outer ends of the leg portions 26 to facilitate movement of the stand 20. A vertical opening 30 is contained in the body portion 24 and setscrews 32 extend into the opening 30 for a purpose to appear.

A cylindrical lower body member 34 containing a depending rod-like portion 36 at the lower end thereof is disposed above the base member 22, the rod-like portion 36 extending into the opening 30. A vertical opening 38 is contained in the upper end of the lower body member 34 and setscrews 40 extend into said opening 38.

A cylindrical upper body member 42 containing a depending rod-like portion 44 at the lower end thereof is disposed above the lower body member 34, the rod-like portion 44 extending into the opening 38. An elongated opening 46 is contained in the upper body member 42 and extends substantially the entire length thereof (Fig. 1).

Two parallel slots 48 and 50 (Fig. 6) are contained in the upper body member 42 adjacent the upper end thereof, the slots defining a portion 52 which contains outwardly extending ears 54 and 56 (Fig. 5). Aligned openings 58 and 60 are contained in the ears 54 and 56, respectively, the opening 58 containing internal threads for a purpose to appear.

A locking member 62 is disposed in engagement with the ears 54 and 56. It includes a cylindrical body portion 64 having a threaded rod-like portion 66 of reduced diameter at one end thereof and a handle portion 68 at the other end. The threaded rod-like portion 66 extends through the opening 60 and into engagement with the threaded opening 58, the two ears 54 and 56 being drawn together when the handle portion 68 is turned in the clockwise direction.

A hollow protuberance 70 is contained adjacent the upper end of the upper body member 42 as shown in Fig. 6. A shaft 72 extends through the walls of the protuberance 70 and a small spur gear 74 is fixedly mounted thereon within the protuberance 70. A crank handle 76 (Figs. 1 and 5) is secured to one end of the shaft 72 whereby the shaft 72 and gear 74 can be rotated in either direction.

A vertically adjustable head member 78 (Fig. 1) is disposed above the upper body member 42. It includes a rod-like body portion 80 (Fig. 7) having a rack 82 extending longitudinally along one side thereof, the body portion 80 being disposed in the elongated opening 46 whereby the gear 74 is in engagement with the rack 82.

A lower joint element 84 (Fig. 7) is fixedly mounted on the upper end of the body portion 80 and contains two spaced upwardly extending ears 86 and 88 which contain aligned openings 90 and 92, respectively. The opening 92 contains internal threads for a purpose to appear.

An upper joint element 94 containing a depending ear-like portion 96 at the lower end thereof is disposed above the lower joint element 84, the ear-like portion 96 being disposed between the spaced ears 86 and 88. An opening 98 in alignment with the openings 90 and 92 is contained in the ear-like portion 96.

A locking member 100 is disposed in engagement with the ears 86, 88 and 96. It is similar in construction to the locking member 62 and contains a cylindrical body portion 102 having a threaded rod-like portion 104 of reduced diameter at one end thereof and a handle portion 106 at the other end. The threaded rod-like portion 104 extends through the openings 86 and 96 and engages the internal threads in the opening 88 whereby the upper and lower joint elements can be locked or the two parts permitted to have limited relative pivotal movement.

The upper joint element 94 is of T-shaped configuration and contains a horizontal cylindrical passageway 108 (Figs. 7 and 10) through the upper portion thereof. A vertical slot 110 (Fig. 1) separates a locking portion 112 from the remainder of the element 94, the former containing a pair of downwardly extending ears 113 and 114 which contain aligned openings. A locking member 116 similar in construction to locking members 62 and 100 is disposed in engagement with the ears 112 and 114 for a purpose to appear.

A shaft 118 (Fig. 10) having a disc-like handle portion 119 at one end thereof extends outwardly from the upper portion of the upper joint element 94 adjacent the end from the locking portion 112. The shaft 118 is rotatably mounted on the upper joint element 94 and contains a small spur gear 120 fixedly mounted adjacent the inner end thereof, the gear 120 being disposed in a chamber immediately below the passageway 108 as shown in Fig. 10.

A guide screw 122 extends downwardly a short distance into the passageway 108 from the top of the upper joint element 94 for a purpose to appear.

As shown in Fig. 2, a bracket 124 is removably secured to one side of the upper joint element 94 by screws 126. A cylindrical cavity 128 (Fig. 7) is contained in the bracket 124 and a setscrew 130 protrudes into said cavity.

As shown in Fig. 2, the elongated cylindrical base of a flexible modeling lamp 132 is disposed in the cavity 128 and maintained in position by means of the setscrew 130.

A horizontal cylindrical bar 134 (Figs. 1 and 2) is slidably disposed in the passageway 108. The bar 134 contains a longitudinally extending rack 136 (Fig. 7) in the bottom portion thereof for engagement with the spur gear 120. A longitudinally extending groove 138 (Figs. 7 and 10) is contained in the upper portion of the bar 134, the groove receiving the lower end of the screw 122 so as to prevent the bar 134 from rotating within the upper joint element 94.

As shown in Figs. 1 and 2, an end portion 140 of the bar 134 is of a reduced diameter.

A C-shaped pan head supporting bracket 142 (Figs. 1 and 2) containing a cylindrical passageway 144 in the bottom portion thereof is slidably mounted on the reduced portion 140. A setscrew 146 extends upwardly into the passageway 144 into contact with the portion 140, thereby maintaining the bracket 142 in a selected position. The upper portion of the bracket 142 contains an opening 148 (Fig. 9) through which a screw 150 extends, the latter engaging the bottom of a pan head 152 which is of conventional construction. The pan head 152 includes a locking lever 154 which, when loosened, permits the pan head to be rotated in a horizontal plane through three hundred and sixty degrees, and a locking arm 156, by means of which the pan head can be pivoted in a vertical plane through approximately one hundred and eighty degrees. Thus, by means of the two right angle movements just described, the pan head 152 has universal tilting movement.

As shown in Fig. 9, a threaded rod 158 and a spacer member 160 extend upwardly from the top of the pan head 152. Disposed on the rod 158 is a camera supporting bracket 162 which is described in my copending application Serial No. 84,061, filed March 29, 1949. Associated with the camera supporting bracket 162 is a focal pointer 163 which is also described in the above-identified application and which includes telescoping sections 164 and a contact ball 165.

A 35 mm. camera C of conventional construction is removably secured on top of the supporting bracket 162 as described in the above-identified application.

As shown in Fig. 8, a bolt 166 with a nut 168 on the end thereof extends upwardly through the upward portion of the pan head 152 adjacent the spacer member 160. An elongated strip-like bracket 170 (Figs. 1 and 2) having a longitudinally extending slot 171 adjacent one end thereof is disposed over the bolt 166, the slot permitting limited movement of the bracket 170 relative to the pan head 152 for a purpose to appear. The other end of the bracket 170 is turned upwardly at right angles to the body of the bracket and a sleeve 172 is fastened to the upturned portion as by welding.

A threaded opening extends through the upturned portion of the bracket 170 and the wall of the sleeve 172 and a setscrew 176 (Figs. 1 and 2) is disposed therein. A rod-like member 178 is slidably disposed in the sleeve 172 and maintained in position by the setscrew 176.

A right angle bracket 180 is disposed above the rod-like member 178, the two being connected together by a hinged joint 182, the movement of which is controlled by a locking lever 184.

Attached to the other end of the right angle bracket 180 is an L-shaped bracket 186, the two brackets being connected together by a hinged joint 188, the movement of which is controlled by a locking lever 190.

A ring-like member 192 is fastened adjacent the upwardly extending portion of the L-shaped bracket 186 as by welding. A threaded opening extends through the bracket and the wall of the member 192. A setscrew 194 is disposed in said opening.

A flash gun 196 of conventional construction and having a cylindrical body portion 198 is associated with the ring-like member 192, the body portion 198 being slidably disposed therein and maintained in selected position by the setscrew 194.

Because the two hinged joints 182 and 188 permit movement in two planes which are at right angles to each other, the flash gun 196 has universal tilting movement. In addition, the ring-like member 192 and the setscrew 194 permit limited vertical movement of the flash gun 196. Also, the slot 171 in the bracket 170 permits the flash gun 196 to be swung about the bolt 166 (Fig. 8) as a pivot point and to be moved back and forth a limited distance relative to the camera C. This last movement is particularly important when photographing persons having different skin textures and colors, or where there is a need for bringing the light close to the subject as when photographing deep body cavities.

As shown in Figs. 1 and 2, a specimen support 200 is slidably mounted on the other end of the horizontal bar 134. It includes an elongated base member 202 (Fig. 3) having an opening 204 through the lower portion thereof to receive the bar 134, and a setscrew 206 extending into the opening for maintaining the base member 202 in selected position on said bar. An elongated vertically extending chamber 208 is contained in the upper portion of the base member 202 and a setscrew 209 and a guide screw 210 protrude into said chamber.

An upwardly extending rod-like member 211 containing a longitudinal groove in the surface thereof is slidably disposed in the chamber 208, the upper end of said member 211 having a T-shaped head 212 fastened thereto by means of a setscrew 214. The head 212 contains a horizontal passageway 216 in the upper portion thereof. A guide screw 218 (Fig. 2) and a setscrew 220 extend into the passageway 216 for a purpose to appear.

A short horizontal bar 222 containing a longitudinally extending slot 224 is slidably disposed in the passageway 216, the guide screw 218 extending into the slot 224 to prevent the bar 222 from rotating relative to the head 212.

A lower platform hinge member 226 containing a cylindrical passageway in the lower portion thereof is slidably mounted on one end of the bar 222. A setscrew 230 extends upwardly into said passageway and into contact with the bar 222 so as to maintain the lower platform hinge member 226 in selected position. An upper platform hinge member 232 is disposed above the lower platform support 226, the two being connected by a hinged joint 234, the action of which is controlled by a locking lever 236 of a construction similar to those previously described.

A plate-like lower specimen platform 238 (Fig. 3) is fastened to the upper surface of the upper platform hinge member 232 by rivets 240, the platform 238 also containing a pair of threaded openings 244 adjacent one edge thereof.

A plate-like upper specimen platform 246 is disposed adjacent one edge of the lower platform 238 at right angles thereto, the former having a pair of clips 248 fastened adjacent the bottom edge by rivets 250. The bottom portion of the clips 248 contains openings 252 in which are disposed screws 254, the ends of which are in engagement with the threaded openings 244 in the platform 238.

As shown in Fig. 15, the device can also be used with one or more photo flood lamps 256, the latter being mounted on the ends of flexible extensions 258 which are connected to a bracket 260. The bracket 260 contains an opening 262 therein which permits it to be slidably mounted on the reduced end portion 140 of the bar 134 and maintained in position by means of a setscrew 264.

Operation

The stand 20 is exceedingly flexible in its operation and can be used for photographing either animate or inanimate objects. The upper portion thereof can be used in either a horizontal or a vertical position, or in any fixed position therebetween, and it can also be used with either flash equipment or photo flood lights, or both.

Assuming that a surgeon desires to take a flashlight photograph of a tumor on a patient's oral mucous membrane before removing it through the medium of surgery, the device 20 with the specimen support 200 removed would be wheeled over to the operating table on the casters 28. The specimen support 200 can be removed from the field of the camera C by either loosening the setscrew 206 (Fig. 3) and sliding the entire assembly off the end of the horizontal bar 134, or, the setscrew 209 can be loosened and the upper portion of the assembly lifted out of the chamber 208, thereby leaving merely the base portion 202 as shown in Fig. 12.

The operator would then loosen the locking member 62, thereby permitting the adjustable head member 78 to be raised or lowered to the desired height by means of the crank handle 76 which rotates the spur gear 74 which is in engagement with the rack 82. After the head member 78 has been brought to the approximate desired height, the locking member 62 would then be tightened, thereby causing the ears 54 and 56 to move together so as to clamp the portion 52 about the body portion 80.

The locking member 100 would then be loosened and the upper portion of the stand 20 manually tilted to the approximate desired angle, the ear 96 pivoting about the shaft 104 between the ears 86 and 88 (Fig. 7). After the upper portion has been tilted to the approximate desired position, the locking member 100 would then be tightened so as to clamp the ear 96 securely between the ears 86 and 88, thereby preventing any further relative pivotal movement.

The locking member 116 would then be loosened, thereby permitting the horizontal bar 134 to be moved longitudinally by means of the handle portion 119 which rotates the spur gear 120 which is in engagement with the rack 136 (Figs. 7 and 10). As was previously mentioned, the end of the guide screw 122 being disposed in the groove 138 prevents the bar 134 from rotating relative to the upper joint element 94.

After the position of the bar 134 has been adjusted so as to bring the camera C into estimated position relative to the patient's mouth, the locking member 116 would be tightened, thereby causing the locking portion 112 to clamp about the bar 134 and maintain it in selected position.

The focal pointer 163 would then be pivoted into the optical axis position as shown in Fig. 1 and the telescoping sections 164 thereof extended until the contact ball 165 is adjacent the tumor which is to be photographed.

It is to be understood that the sequence of the above-mentioned adjustments was given merely for purposes of illustration, and that different operators might use different sequences, the main point, however, being that, regardless of the sequence, the contact ball 165 can be brought into approximate position quickly and easily with a minimum number of adjustments after the operator has had a little experience.

After the contact ball 165 has been brought adjacent the tumor, the nut 168 (Fig. 8) would be loosened and the bracket 170 moved longitudinally until the flash gun 196 is in the proper position relative to the subject. As commented on previously, it is necessary to adjust the flash gun 196 relative to the subject due to the differences in skin color and texture or desired depth of light penetration, the gun being moved closer for dark complexioned persons and farther away for lighter types, and, by the same token, at extreme nearness to the subject in the instance of deep cavity penetration. After the proper adjustment has been made, the nut 168 would be tightened, thereby locking the bracket 170 in position.

The setscrew 176 (Figs. 1 and 2) and the locking lever 190 would then be loosened, and the flash gun 196 raised to the desired position above the camera C and then tilted as shown in Fig. 2 so that the center of the flash beam will be in approximate alignment with the patient's mouth. The setscrew 176 and the locking lever 190 would then be tightened so as to maintain the flash gun 196 in its selected position.

It will be noted at this point that there are two adjustments for varying the height of the flash gun 196. The setscrew 194 can be loosened and the body portion 198 moved in the ring 192 or the setscrew 176 can be loosened (as described previously) and the rod-like member 178 moved within the sleeve 172.

If desirable, the flash gun 196 could be tilted so as to extend horizontally alongside of the camera C by merely loosening the rocking lever 184 and tilting the upper portion of the gun sideways.

Also, if desirable, the flash gun 196 could be moved into a vertical position alongside the camera C by merely loosening the nut 168 (Fig. 8) and pivoting the bracket 170 about the bolt 166.

After the flash gun 196 has been locked in position, the telescoping sections 164 of the focal pointer 163 are brought into exact alignment with the tumor by means of the pan head 152, the loosening of the locking lever 154 (Fig. 9) permitting horizontal movement and the loosening of the locking arm 156 (Fig. 8) permitting vertical movement, in a manner well known in the art. The contact ball 165 would then be removed, sterilized, and replaced and then be brought into contact with the tumor by extending the sections 164, the focal distance being noted from the telescoping sections 164, and the camera adjusted as described in my copending application Serial No. 84,061.

The focal pointer 163 would then be pivoted out of focal range to a position as shown in Fig. 2, and the photograph taken in the well known manner.

If desirable, the photo flood lamps 256 (Fig. 15) can be used with animate objects, but I have found them objectionable due to the excessive heat and intense glare created, both combining to effect an annoyance to the living subject causing an involuntary assumption of an unnatural expression. The latter expression is a definite deterrent to physiognomy study, whereas in flashlight photography facial expression is indelibly impressed upon the negative prior to the subject's physical action to the flashlight's annoyance.

If the photo flood lamps 256 are used, they are brought into the desired positions by bending and shaping the extensions 258.

Furthermore, if the operator does not wish to use the strong overhead lights while adjusting the apparatus, the modeling light 132 (Fig. 2) can be used.

Thus, it is apparent that all of the equipment the photographer needs for setting up the camera, for focusing it, and taking either flash or photo flood photographs is right at his fingertips so that he can take photographs with a minimum amount of preparation and without the confusion which usually accompanies the taking of photographs using known equipment and means.

To take photographs of inanimate objects such as teeth which have been extracted, models, instruments, biological specimens, etc., the adjustments are substantially the same as described previously, the only difference being that the specimen support 200 remains in place.

As will be apparent from Figs. 1 and 3, the horizonal distance between the specimen platform and the camera C can be varied by either loosening the setscrew 206 and moving the support 200 along the rod 134 or by loosening the setscrew 220 and sliding the rod 222 relative to the head 212.

The vertical distance between the platforms and the camera C can also be varied by loosening the setscrew 209 and raising or lowering the rod-like member 211 in the chamber 208.

It will be noted that both the base member 202 and the T-shaped head 212 contain guide screws 210 and 218, respectively, which engage the slot in the rod-like member 211 and the short horizontal bar 222, respectively, so as to prevent the specimen platforms from revolving about the rod-like member 211 when the T-shaped head 212 is raised or lowered, and to prevent the short horizontal bar 222 from rotating within the T-shaped head 212 when the former is moved through it.

If, when using the specimen 200, it is desirable to use only the lower specimen platform 238, the upper specimen platform 246 and the clips 248 associated therewith can be quickly and easily removed by merely removing the setscrews 254 which secure the clips 248 to the lower platform 238.

If the device 20 is to be employed in the photographing of an organ or other portion of the human anatomy, removed as the result of surgery, or for the photographing of printed copy, instruments, commercial specimens, etc., the device would be arranged as shown in Fig. 11. In this arrangement, the locking member 100 would be loosened and the bar 134 swung into a vertical position with the camera C on the upper end thereof. The upper specimen platform 246 and clips 248 would then be removed as described above. The locking lever 236 would then be loosened and the specimen platform 238 tilted to a horizontal position. The specimen to be photographed would then be placed on the specimen platform 238 and the flash gun 196, the camera C, and the focal pointer 163 adjusted as described previously.

If the device 20 is to be used for taking motion pictures or for photographing various phases of an operation which is to be performed on an operating table, the device would be arranged as shown in Fig. 12. In this arrangement, the bar 134 would be swung into a vertical position with the camera C at the upper end thereof, as described above, the specimen support 200 would be removed by loosening the setscrew 206 (Fig. 3) and sliding it off the end of the bar 134 and a long C-shaped pan head supporting bracket 266 (Figs. 13 and 14) would be substituted for the short bracket 142. The long supporting bracket 266 permits the camera C to be moved the width of the operating table without moving the base member 22 from one side of the table to the other.

The camera C can be moved vertically with respect to the operating table by either the crank handle 76 or the handle portion 119, and it can be moved longitudinally or transversely relative thereto by moving the entire unit on the casters 28.

After the camera C is moved into position, the flash gun 196 and the focal pointer 163 can be adjusted as described previously.

Thus, it is apparent that by having the lighting equipment, the focusing means, and the adjusting means all concentrated on one stand in close adjusting proximity to each other, the camera C can be set up and the pictures taken with a minimum amount of time and confusion and under the most sanitary conditions, there being no need for the photographer to assume a position above the operating table as is the case when ground glass focusing cameras are used.

Another advantage of the present construction is that the device 20 can be easily and quickly disassembled and all the parts packaged in a traveling case which can be transported by a single individual.

Thus, it is apparent that there has been provided a novel photographic stand which fulfills all of the objects and advantages sought therefor.

It is to be understood that the foregoing description and the accompanying drawings have been given only by way of illustration and example, and that changes and alterations in the present disclosure which will be readily apparent to one skilled in the art are contemplated as within the scope of the present invention, which is limited only by the claims which follow:

What is claimed is:

1. A device of the type described, comprising a base member; a bar-like member disposed above said base member; means for supporting said bar-like member at selected distances above the base member; means for locking said bar-like member in selected vertical position; means for moving said bar-like member transversely of the base member; means for locking said bar-like member in selected transverse position; means for tilting said bar-like member relative to the base member; means for locking said bar-like member in selected tilted position; a camera support having universal tilting movement removably mounted on said bar-like member adjacent one end thereof; and light providing means having universal tilting movement associated with said camera support and adjustable with respect thereto.

2. A device of the type described, comprising a base member; a bar-like member disposed above said base member; means for supporting said bar-like member at selected distances above the base member; means for locking said bar-like member in selected vertical position; a specimen support removably and adjustably mounted so as to have universal tilting movement on the bar-like member adjacent one end thereof; a camera support having universal tilting movement removably mounted on the bar-like member adjacent the other end; and light providing means having universal tilting movement associated with said camera support and adjustable with respect thereto.

3. In a device of the type described, a base member having a transverse passageway adjacent the upper end thereof; a bar-like member slidably mounted in said passageway; means preventing the bar-like member from rotating in said passageway; a camera support removably mounted on said bar-like member adjacent one end thereof; and a specimen support removably mounted on said bar-like member adjacent the other end, said specimen support including a body element containing a passageway in the bottom portion thereof, a head element containing an opening therethrough disposed above the body element, means for supporting said head element at various distances above the body element, means for locking the head element in selected position, means preventing rotation of said supporting means relative to the body element, a short rod-like member slidably mounted in the opening through the head element, means preventing said rod-like member from rotating in said opening, means for locking said rod-like member in selected position, a lower plate-like specimen platform pivotally and removably mounted on said rod-like member adjacent one end thereof, means for locking the lower platform in selected position, and an upper plate-like specimen platform removably mounted on the lower specimen platform at one edge thereof and normal thereto.

4. A device of the type described, comprising a base member, an elongated body member removably fastened to the base member and extending upwardly therefrom, the body member including at least two sections removably fitted together, the upper section containing an elongated chamber having an opening at the upper end thereof; a rod-like member slidably disposed in said chamber; means for mechanically moving said rod-like member relative to the body member; means for locking said rod-like member in selected position; a head member containing a transverse passageway therethrough pivotally mounted on the upper end of the rod-like member; means for locking the head member in selected position; a bar-like member adapted for mounting supportable attachments slidably mounted in the passageway; means for mechanically moving said bar-like member relative to the head member; means for locking the bar-like member in selected position; and means preventing the bar-like member from rotating in the passageway during sliding movement thereof.

5. A specimen support, comprising an elongated base member having a transverse opening through the bottom portion and containing an elongated chamber in the upper portion thereof; a setscrew extending into the opening; a rod-like member slidably disposed in the chamber; means for locking said rod-like member in selected position within the chamber; a head member having a transverse passageway extending therethrough removably mounted on the upper end of the rod-like member; a bar-like member slidably disposed in the passageway in the head member; means for locking said bar-like member in selected position within the passageway; a lower hinge member slidably and removably mounted on one end of said bar-like member; an upper hinge member pivotally mounted on the lower hinge member; means for locking the hinge members in position; a first plate-like specimen platform secured to the upper end of the upper hinge member; and a second plate-like specimen platform removably mounted adjacent one edge of the first platform and normal thereto.

6. A device of the type described, comprising an elongated member containing a transverse opening through the lower portion thereof; a setscrew extending into said opening; a camera support having universal tilting movement removably mounted adjacent the upper end of said elongated member; a stud-like member protruding from the upper portion of the camera support; an elongated bracket having a longitudinally extending slot adjacent one end thereof associated with said stud-like member, the latter extending through said slot; a ring-like member mounted adjacent the other end of said bracket; a rod-like member slidably mounted in said ring-like member; means for locking said rod-like member in position within the ring-like member; a flash gun holder mounted at the upper end of the rod-like member, the holder having universal tilting movement relative thereto; and means for locking the flash gun holder in selected position relative to the rod-like member.

7. In an apparatus of the kind described, a base, a vertically adjustable camera support, angular adjustment means adjustably mounting for universal tilting movement the camera support on the base for varying the angle of the optical axis of the camera relative to the base, and optical axis adjustment means for adjusting the camera relatively to the base along its optical axis, toward and from the subject to be photographed, and an adjustable focal distance pointer connected with the camera to be adjustable therewith and having a pivotal connection so that it can be operated in the optical axis of the camera or can be swung away therefrom, whereby the optical axis adjustment means may bring the angularly adjusted camera to proper distance from the subject.

EDWARD D. MARKLE.

REFERENCES CITED

The following references are of record in the file of this patent:

UNITED STATES PATENTS

| Number | Name | Date |
|---|---|---|
| 94,120 | Knapp | Aug. 24, 1869 |
| 817,207 | Wheeler | Apr. 10, 1906 |
| 2,314,033 | Curran | Mar. 16, 1943 |
| 2,322,032 | Kunze | June 15, 1943 |
| 2,324,842 | Huebner | July 20, 1943 |
| 2,325,569 | Hancock | July 27, 1943 |
| 2,418,067 | Carpenter | Mar. 25, 1947 |
| 2,441,370 | Pearce | May 11, 1948 |
| 2,505,990 | Pollack | May 2, 1950 |